(12) United States Patent
Lahogue et al.

(10) Patent No.: US 11,548,202 B2
(45) Date of Patent: Jan. 10, 2023

(54) METHOD OF MANAGING PREFORMS IMMOBILIZED IN A HEATING STATION

(71) Applicant: SIDEL PARTICIPATIONS, Octeville-sur-Mer (FR)

(72) Inventors: Yoann Lahogue, Octeville-sur-Mer (FR); Guy Feuilloley, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/290,623

(22) PCT Filed: Oct. 29, 2019

(86) PCT No.: PCT/FR2019/052567
§ 371 (c)(1),
(2) Date: Apr. 30, 2021

(87) PCT Pub. No.: WO2020/089556
PCT Pub. Date: May 7, 2020

(65) Prior Publication Data
US 2022/0032528 A1  Feb. 3, 2022

(30) Foreign Application Priority Data
Nov. 2, 2018  (FR) ...................................... 1860128

(51) Int. Cl.
*B29C 49/42*  (2006.01)
*B29C 49/64*  (2006.01)
(Continued)

(52) U.S. Cl.
CPC .......... *B29C 49/4205* (2013.01); *B29C 49/36* (2013.01); *B29C 49/4284* (2013.01);
(Continued)

(58) Field of Classification Search
CPC ............ B29C 49/4205; B29C 49/4284; B29C 49/42107; B29C 49/42109; B29C 49/42382; B29C 49/42407; B29C 49/42
See application file for complete search history.

(56) References Cited

U.S. PATENT DOCUMENTS 7,425,296 B2 * 9/2008 Cochran .................... A23L 3/26
257/14
2010/0089906 A1 * 4/2010 Plantamura ........... B29B 13/023
219/645
(Continued)

FOREIGN PATENT DOCUMENTS

DE         10259589 B3    4/2004
DE      102005060814 A1   7/2007
(Continued)

OTHER PUBLICATIONS

International search report dated Feb. 5, 2020.

*Primary Examiner* — Robert B Davis

(57) ABSTRACT

The invention concerns a method for managing captive preforms immobilized in a heating station during an interruption of production, the preforms following a production stream, the heating station including a device for conveying preforms and a heating cavity bordered by at least one row of emitters of monochromatic electromagnetic radiation. The method consists in ejecting from the production stream the cold captive preforms that have been immobilized before they have been exposed to the electromagnetic radiation emitted by the emitters to a recycling stream and rejecting from the production stream the hot captive preforms that have been at least partly exposed to the electromagnetic radiation emitted by the emitters to a reject stream separate from the recycling stream.

18 Claims, 3 Drawing Sheets

(51) Int. Cl.
*B29C 49/36* (2006.01)
*B29C 49/70* (2006.01)
*B29C 49/06* (2006.01)

(52) U.S. Cl.
CPC .......... *B29C 49/6418* (2013.01); *B29C 49/70* (2013.01); *B29C 49/06* (2013.01)

(56) References Cited

U.S. PATENT DOCUMENTS

2012/0098153 A1* 4/2012 Forsthovel .............. B29C 45/76
425/169
2013/0277892 A1* 10/2013 Hahn .................. B29C 49/4205
425/526

FOREIGN PATENT DOCUMENTS

| DE | 102012101915 A1 | 9/2013 |
| EP | 0571262 A1 | 11/1993 |
| FR | 3028204 A1 | 5/2016 |

\* cited by examiner

METHOD OF MANAGING PREFORMS IMMOBILIZED IN A HEATING STATION

TECHNICAL FIELD OF THE INVENTION

The invention concerns a method of managing captive preforms immobilized in a heating station during an interruption of production, and a heating station for the execution of the method.

TECHNICAL BACKGROUND OF THE INVENTION

The invention is intended to be employed in an installation for production of thermoplastic material and in particular polyethylene terephthalate (PET) preforms containers by forming, in particular by blowing or stretching-blowing, preforms. An installation of this kind enables production of containers in very long runs at very high throughputs.

It is known to produce thermoplastic material, such as polyethylene terephthalate (PET), containers by a method of forming preforms.

In accordance with a well-known technique, containers of this kind are produced in two main steps.

In a first step a PET preform is injection molded. This preform includes a substantially tubular body that is closed at one of its axial ends, the opposite end being open via a neck. As early as this injection molding operation, the neck has the final shape of the neck of the container. The neck of the container generally includes a screwthread.

In a second, forming step the hot preforms are placed in mold cavities. A pressurized forming fluid is then injected into the preforms to press the wall of the preform against the walls of the cavity to conform the preform into the finished container. This blowing operation is generally accompanied by a stretching operation consists in introducing an elongator rod into the preform via its neck in order to stretch the wall of the preform axially.

In numerous cases the preforms are produced by injection molding at a first location and are blow molded to the final shape of the container at a second location on a specific production installation. This kind of technology allows the blow molding operation to be carried out as close as possible to the bottling location, the injection molding operation being able to be carried out at any location. In fact, it is relatively easy and relatively inexpensive to transport preforms of small size whereas transporting containers after blowing has the drawback of being relatively uneconomic because of their very large volume.

To allow it to be formed, the body of the preform is heated beyond a glass transition temperature enabling the wall of the body to be rendered malleable. In contrast, the neck is maintained at a temperature lower than the glass transition temperature to prevent it being deformed. To this end the production installation includes a heating station that allows the body of the preforms to be heated to the temperature required to execute the forming step.

Classic heating stations are equipped with halogen type incandescent lamps that radiate in accordance with Planck's law over a continuous spectrum.

Before launching any production run, it is necessary to preheat the heating station, with the aid of the lamps, to bring it to a suitable temperature susceptible to confer on the preforms a thermal profile allowing the forming to be carried out properly thereafter.

This preheating is slow and necessitates delicate adjustments.

Moreover, the lamps generally radiate heat in all directions. To allow the efficiency of the heating station to be increased, it is known to arrange reflectors that allow the heating radiation to be reflected in the direction of the preforms.

The radiation emitted by the lamps not being directional, numerous elements of the heating station, in particular the reflectors, accumulate heat during preheating. The result of this is that during an unscheduled stop of production the extinction of the lamps does not allow an immediate reduction of the temperature inside the heating station. The various heated elements in fact restore the accumulated heat by a phenomenon of thermal inertia. It follows that the preforms immobilized in the heating station continue to be heated in an uncontrolled manner, which renders them unsuitable for forming. The immobilized preforms heated in this way must therefore be rejected.

BRIEF SUMMARY OF THE INVENTION

The invention proposes a method for managing captive preforms immobilized in a heating station during an interruption of production, the heating station forming part of an installation for production of thermoplastic material containers by forming preforms heated by the heating station, the preforms following a production stream through the production installation, the heating station including:
- a device for conveying preforms including individual supports circulating in a closed circuit, each individual support being intended to support a preform in continuous movement along a predetermined transport path forming a section of the production stream from an entry point to an exit point,
- a heating cavity bordered by at least one row of emitters of monochromatic electromagnetic radiation commanded between an extinguished state and a lit state, the heating cavity being crossed by the transport path;
- characterized in that the method consists in ejecting from the production stream the so-called "cold" captive preforms that have been immobilized before they have been exposed to the electromagnetic radiation emitted by the emitters to a recycling stream and rejecting from the production stream the so-called "hot" captive preforms that have been at least partly exposed to the electromagnetic radiation emitted by the emitters to a reject stream separate from the recycling stream.

In accordance with other features of the method executed in accordance with the teachings of the invention:
- the cold captive preforms and the hot captive preforms are selectively ejected from the production stream by two distinct devices for ejecting preforms;
- the cold captive preforms and the hot captive preforms are ejected from the production stream by a common ejector device;
- the cold captive preforms, respectively the hot captive preforms, ejected by the common ejector device are selectively switched to the recycling stream, respectively to the reject stream, by a sorting device;
- the cold captive preforms are ejected from the production stream upstream of the heating cavity;
- the cold captive preforms are ejected from the production stream downstream of the heating cavity;
- the cold captive preforms are ejected from the production stream downstream of the exit point of the heating station, for example when the preforms are taken up by a transfer wheel arranged directly downstream of the heating station;

the emitters of the heating cavity are maintained in an extinguished state for as long as the cold captive preforms circulate in the heating cavity;

at least some of the cold captive preforms oriented toward the recycling stream are subsequently transformed into finished containers by forming after heating;

the cold captive preforms oriented toward the recycling stream are again introduced into the production stream upstream of the heating station;

at least some of the cold captive preforms oriented toward the recycling stream are destroyed and the material thereof is re-used to produce new preforms;

the production installation includes a forming station that is arranged downstream of the heating station along the production stream, the hot captive preforms being ejected from the production stream downstream of the heating station, for example at the level of the forming station.

The invention also proposes a heating station for executing the method, characterized in that it includes a first ejector device arranged along the transport path downstream of the heating cavity allowing selective ejection of a preform from its individual support upstream of the exit point, the preform ejected in this way being directed toward the reject stream, and in that it includes a second ejector device arranged along the transport path allowing selective ejection of a preform from its individual support upstream of the exit point, the preform ejected in this way being directed toward a recycling stream in the direction of the entry point of the heating station.

The invention also proposes a container production installation for executing the method, characterized in that it includes a common device for ejecting captive preforms, the production installation including a device for selectively sorting the preforms ejected by said common ejector device toward a recycling stream or toward a reject stream.

BRIEF DESCRIPTION OF THE FIGURES

Other features and advantages of the invention will become apparent when reading the following detailed description to explain which reference will be made to the appended drawings, in which.

DETAILED DESCRIPTION OF THE FIGURES

In the remainder of the description elements having an identical structure or analogous functions will be designated by the same reference.

In the remainder of the description there will be adopted in a non-limiting way orientations that are longitudinal, directed in the direction of movement of the preforms along their transport path, vertical, directed in the direction of gravity, and transverse, indicated by the trihedron L,V,T in the figures.

In the remainder of the description, the terms "upstream" and "downstream" will be employed with reference to the direction of movement of the preforms along their production stream "P" and in particular along their transport path.

Figure 1:
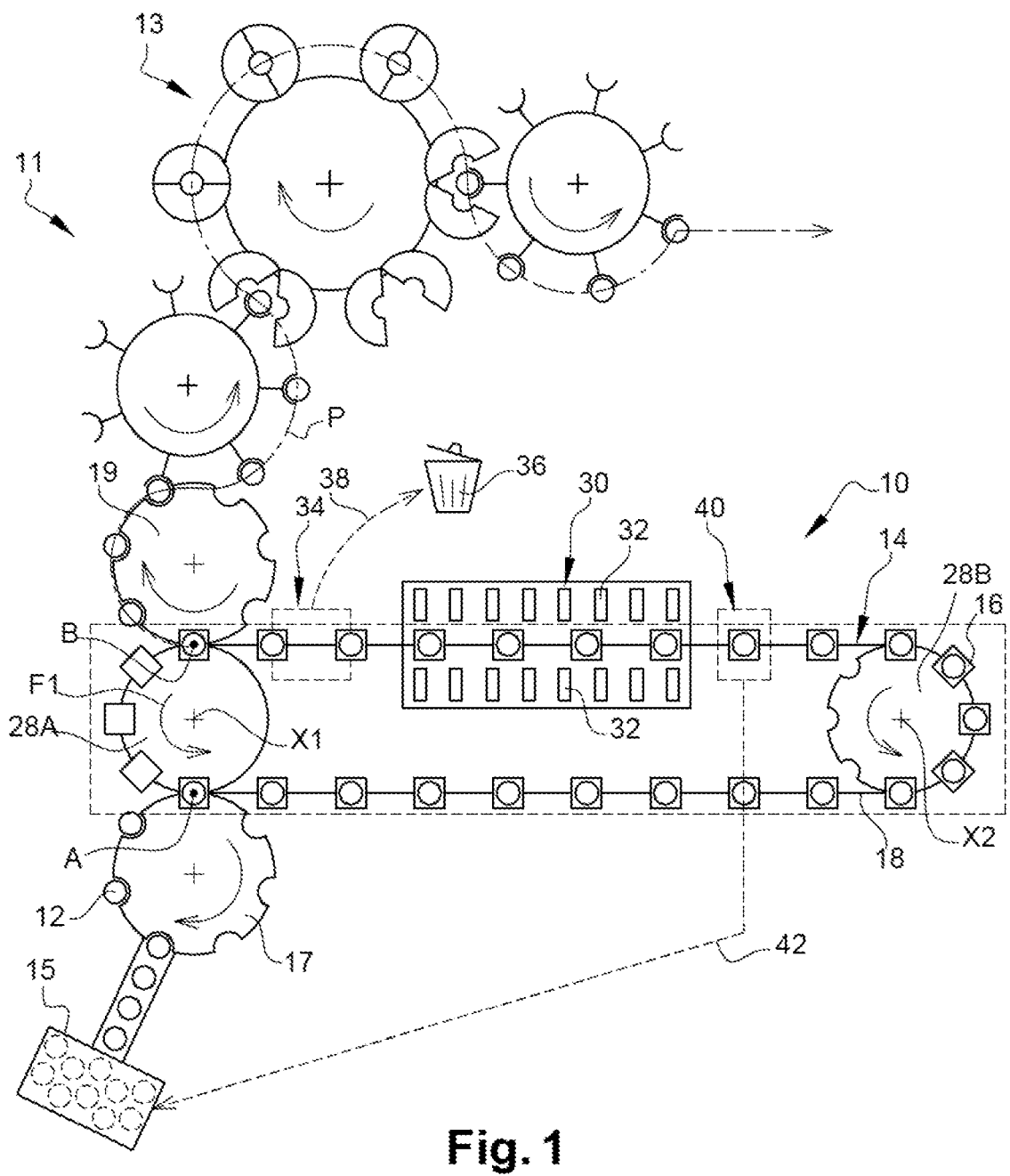
FIG. 1 is a view from above that represents schematically an installation for producing containers from preforms produced using the teachings of the invention.

There has been represented in FIG. 1 a station 10 for heating thermoplastic material preforms 12. The heating station 10 is part of an installation 11 for producing thermoplastic material containers by forming, in particular stretching-blowing, said preforms 12.

The preforms 12 move in single file through the production installation 11 following a production stream "P" from an entry point "A" of the heating station 10 to an exit from the production installation 11 in the form of finished containers conforming to a specification after forming in a forming station 13. Along the production stream "P" the preforms 12 and the finished containers move in single file and are held individually by individual supports such as clamps, notches, molds, etc.

The heating station 10 includes a device 14 for conveying preforms 12 in single file. The conveyor device 14 includes individual supports 16 circulating in a closed circuit in the heating station 10. Each individual support 16 is intended to transport a preform 12 in continuous movement along a predetermined transport path 18 from an entry point "A" of the heating station 10 that is fed by a single file of preforms 12 to an exit point "B" in the direction of the forming station 13, in particular molding by blowing or by stretching-blowing. The transport path 18 forms a section of the production stream "P" of the preforms 12.

The production installation 11 includes a device 15 for lining up and straightening up the preforms 12 into which the preforms 12 are tipped in bulk and in which the preforms 12 are lined up and straightened up. This lining up and straightening up device 15 feeds the heating station 10 with preforms 12. There exist numerous alignment and straightening up devices such as centrifuge devices and gravity rail devices. Those devices are well known and will not be described in detail hereinafter.

Here the conveyor device 14 is fed with cold preforms 12 by a transfer wheel 17 disposed between the lining up and straightening up device 15 and the heating station 10. The transfer wheel 17 is arranged tangentially to the entry point "A" whereas the hot preforms 12 are taken up individually by a transfer wheel 19 arranged tangentially to the exit point "B". From the exit point "B" to the entry point "A" the individual supports 16 of the conveyor device 14 circulate empty.

Each individual support 16 generally includes means able to drive the preform 12 in rotation about its main axis during its movement along at least a part of the transport path 18 to allow homogeneous heating of the body of the preform 12. An individual support 16 of this kind is sometimes termed a "whirler".

Figure 2:
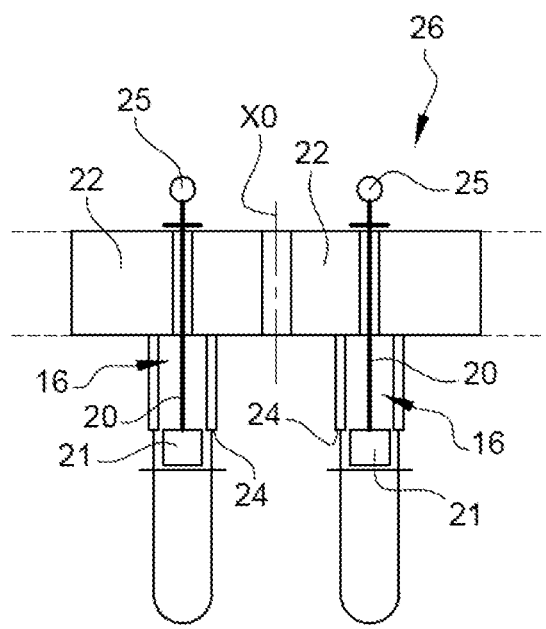
FIG. 2 is a side view that represents schematically a portion of a device for conveying preforms that is part of a heating station of the installation from FIG. 1.
Figure 2:
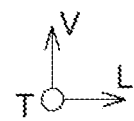
Figure 3:
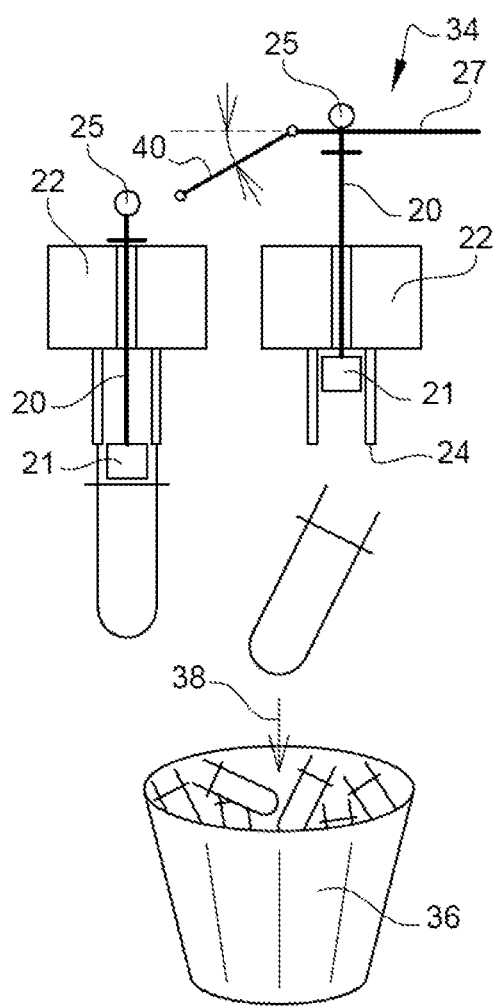
FIG. 3 is a view similar to that of FIG. 2 that represents the conveyor device passing a device of the heating station for ejecting preforms in the direction of a reject stream.
Figure 3:
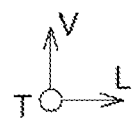
Figure 4:
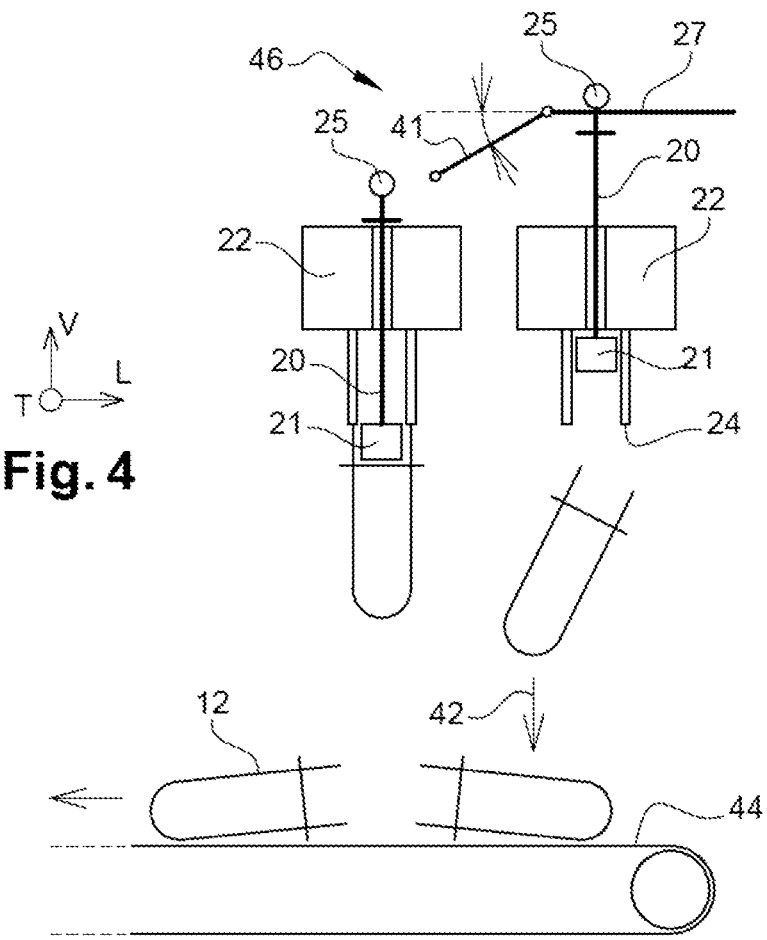
FIG. 4 is a view similar to that of FIG. 3 that represents the conveyor device passing a device of the heating station for ejecting preforms in the direction of a recycling stream.

In the embodiment represented in FIGS. 2 to 4 the conveyor device 14 here includes a plurality of transport elements 22 forming the links of a closed transport chain 26 a portion of which can be seen in FIG. 2. The transport chain 26 is flexible. To this end the transport elements 22 are articulated to one another about vertical axes "X0". The transport chain 26 is mounted to be movable relative to a fixed frame relative to the floor of the heating station 10.

Referring again to FIG. 2, each transport element 22 carries at least one individual support 16. Each individual support 16 includes a mandrel 21.

In known manner, the mandrel 21 is provided with elastic means (not represented), such as an O-ring, advantageously made of an elastic material (such as an elastomer) and the outside diameter of which is equal to or slightly greater than the inside diameter of the neck of a preform 12 so as to support the preform 12 by rubbing against the internal wall of the neck when the mandrel 21 is inserted in the neck of the preform 12.

In the example represented in the figures, each individual support 16 is able to be commanded between an active position in which the preform 12 moves with the individual support 16 and an inactive position in which the preform 12 is totally free relative to the individual support 16.

Here the mandrel 21 is mounted to slide in vertical translation along a vertical axis relative to the transport element 22. The mandrel 21 is fixed to the lower end of a cylindrical rod 20.

The mandrel 21 is mounted to slide vertically relative to the transport element 22 between an inactive position in which the mandrel 21 is retracted relative to an abutment face 24 (on the right in FIG. 3) and an active position (FIG. 2 and on the left in FIG. 3) in which the mandrel 21 projects downward relative to the abutment face 24 to be inserted in the neck of a preform 12. By way of non-limiting example the abutment face 24 is here mounted on and fixed relative to the transport element 22.

In accordance with one non-limiting example the mandrel 21 is here urged elastically toward its active position and is commanded toward its inactive position by cooperation between a cam follower roller 25, here arranged at an upper end of the rod 20, with a cam 27, illustrated in FIG. 3, which acts in opposition to the elastic return force.

More particularly, in the active position, the mandrel 21 is intended to be inserted in the neck of a preform 12 whereas in the inactive position the mandrel 21 is intended to be extracted from the neck of said preform 12, the preform 12 bearing against the abutment face 24 to allow its extraction.

In a variant of the invention that is not represented the mandrel is intended to seize the neck of the hollow body from the outside. This variant is well known to the person skilled in the art and will therefore not be described in more detail hereinafter.

In accordance with a variant of the invention that is not represented the preforms are loaded onto or offloaded from their support by take-up clamps that move conjointly with the supports over at least a part of their path, the clamps being mobile axially relative to the support to allow nesting or de-nesting of the preforms on and from their mandrel. In this case the mandrels do not slide relative to the transport element. The clamps are for example carried by a guide wheel of the transport chain.

Referring again to FIG. 1, the conveyor device 14 further includes a first wheel 28A for guiding the transport chain 26 and a second wheel 28B for guiding the transport chain 26 each mounted to be rotatable on the frame of the heating station 10 about a respective vertical axis "X1, X2". The transport chain 26 meshes around two guide wheels 28A, 28B. One of the two guide wheels, termed the driving wheel, is driven in rotation by a motor to move the transport chain in order to move the transport elements 22 along the closed circuit. Here the guide wheels 28A, 28B turn in an anti-clockwise direction, as is indicated by the arrow "F1" in FIG. 1.

In a variant of the invention that is not represented the transport chain allows the preforms to be compacted by folding accordion fashion when they enter the heating cavity as is described in detail in the document EP-B1-2.623.439.

In accordance with a variant of the invention that is not represented the conveyor device is formed of transport elements that are not interconnected and that form shuttles circulating on rails disposed in a closed circuit. The carriages and the rails form for example a linear motor, the rail forming a flat "stator" and the carriage forming a rotor of said linear motor. This kind of conveyor device for a heating station is described for example in the document FR-A1-3.035.651.

Moreover, each individual support 16 is able to drive the preform 12 in rotation about its axis as it moves along the transport path 18 to allow homogeneous heating of said preform 12.

In accordance with a first example that is not represented the individual support 16 is driven in rotation by a gear rigidly attached to the mandrel 21 that cooperates with a fixed rack of the heating station 10.

In accordance with another example that is not represented the individual support 16 is driven in rotation by means of an electric motor on the transport element 22.

Referring again to FIG. 1, the heating station 10 also includes a heating cavity 30 crossed by the transport path 18 to allow heating of the preforms 12 as they move. The heating cavity 30 is arranged on a portion of the transport path 18 near the exit point "B" of the preforms.

The heating cavity 30 is intended to heat the bodies of the preforms 12 above their glass transition temperature to allow them to be formed by the forming station 13 while they are hot.

The heating cavity 30 is bordered by a series of adjacent emitters 32, for example two rows of emitters 32 facing one another.

Each emitter 32 is equipped with sources of monochromatic electromagnetic radiation (in particular lasers) the emission spectrum of which lies for the most part in the infrared range.

In theory, a monochromatic source is an ideal source emitting a sinusoidal wave at a single frequency. In other words, its frequency spectrum consists of a single ray of zero spectral width (Dirac ray).

In practice, no such source exists, a real source having a frequency emission spectrum that extends over a small but non-zero spectral bandwidth centered on a main frequency at which the intensity of the radiation is the maximum. For the requirements of the present application, this kind of real source is considered monochromatic. Likewise, for the requirements of the present description, a multimode source, that is to say one emitting over a discrete spectrum comprising a plurality of narrow bands centered on distinct main frequencies, is considered a monochromatic source.

The advantage of monochromatic radiation is that, well chosen, it can be concentrated on one (or more) frequency or frequencies for which the thermal behavior of the material of the preforms 12 is particularly interesting in terms of absorption.

By way of example, to obtain rapid heating at the surface of the preforms 12 there may be chosen one (or more) frequency or frequencies in the infrared at which the material is highly absorbent. On the other hand, to obtain slower but more homogeneous heating within the thickness of the preforms 12 one (or more) frequency or frequencies may be chosen for which the material is relatively less absorbent.

In practice, the sources with which the emitters 32 are provided are lasers (for example laser diodes) emitting in the infrared and organized by juxtaposition and superposition to form one or more matrices.

In this instance, each matrix may be a vertical cavity surface emitting laser (VCSEL) diode, each diode emitting for example a laser beam with a unit power of the order of 1 milliwatt at a wavelength of approximately 1 µm.

These sources are radiating sources, that is to say that the radiation emitted is transmitted to the preforms 12 without the air serving as a transmission vector.

The sources convert the electrical energy that is supplied to them into an electromagnetic field radiated in the cavity.

The emitters 32 are commanded between an extinguished state in which they do not emit any radiation and a lit state in which they are fed with electrical energy to emit radiation. This electrical energy may be variable. In accordance with one embodiment that is not represented the heating station advantageously includes a power controller for the supply of electrical power to the emitters 32. This controller may be analog or electronic.

In normal operation of the heating station 10 the emitters 32 are commanded in such a manner as to heat the body of the preforms 12 in accordance with a particular thermal profile that is adapted to the shape of the finished container to be formed.

A heating station 10 functioning by means of this technology has numerous advantages compared to a conventional oven with halogen lamps. Inter alia, in this type of heating station 10:
  the emitters 32 radiate in the infrared with no diffusion of heat which, in contrast to a halogen oven, renders ventilation of no utility;
  the preforms 12 can be heated in accordance with more precise thermal profiles;
  no preheating is necessary.

The inventors have noted that, over and above these known advantages, the thermal inertia of the heating station 10 has become negligible, in particular because of the absence of diffusion of heat. In other words, the preforms 12 are heated above their glass transition temperature only when they are exposed directly to the radiation emitted by the emitters 32 in the heating cavity 30.

In the event of unintended interruption of the circulation of the preforms 12 in the heating station 10 the preforms 12 on the conveyor device 14 find themselves captive inside the heating station 10. Thus they are immobilized on the transport path 18. Such preforms 12 will be referred to hereinafter as "captive preforms 12".

The captive preforms 12 that are immobilized upstream of the heating cavity 30 have not been exposed to the radiation from the emitters 32. They are therefore bathed in a cold atmosphere compared to their glass transition temperature. These preforms 12 will be referred to hereinafter as "cold captive preforms 12".

The captive preforms 12 that are immobilized in the heating cavity 30 or downstream of the heating cavity have been at least partly exposed to the radiation from the emitters 32. These preforms 12 will be referred to hereinafter as "hot captive preforms 12" because their body has been heated to a temperature approaching or exceeding their glass transition temperature.

To prevent the captive preforms 12 immobilized in the heating cavity 30 from melting the emitters 32 are extinguished as soon as interruption of circulation of the preforms 12 is detected.

If the hot captive preforms 12 are immobilized for too long the temperature of their bodies slowly decreases, which causes crystallization of the thermoplastic material. A preform 12 of this kind can no longer become malleable again by heating it and can therefore no longer be used to form a finished container. These preforms 12 are traditionally sent to reject.

Following the interruption of production the heating station 10 therefore contains two types of captive preforms 12, namely cold captive preforms 12 and hot captive preforms 12.

The invention proposes a method for management of the captive preforms 12 that consists in sorting the cold captive preforms from the hot captive preforms. The cold captive preforms are more particularly ejected from the production stream "P" to a recycling stream without having been exposed to the radiation from the emitters 32. The hot captive preforms 12 are ejected from the production stream to a reject stream separate from the recycling stream.

Thus the invention proposes a management method that enables advantage to be drawn from the fact that the material constituting the cold captive preforms 12 still has the structural properties allowing it to undergo a forming operation after heating for the production of finished containers. The invention more particularly proposes to reject the hot captive preforms 12 and to use the cold captive preforms 12.

Accordingly, going against current practice, not all the captive preforms 12 are rejected. This enables the container manufacturer to achieve a non-negligible saving.

For example, at least some of the cold captive preforms 12 that are oriented toward the recycling stream 42 are subsequently transformed into finished containers by forming after heating either by said production installation 11 or by another, similar production installation located elsewhere.

In the case of heating by the heating station 10 the cold captive preforms 12 oriented toward the recycling stream 42 are again introduced into the production stream "P" at the start of the heating station 10. The recycled cold captive preforms 12 are for example mixed in bulk with new preforms 12 in the lining up and straightening up device 15, as is indicated by the arrow 42 in FIG. 1.

In accordance with a variant of the invention, at least some of the cold captive preforms 12 that are oriented toward the recycling stream 42 are destroyed and the material thereof is reused to produce new preforms 12, for example by injection molding or by extrusion.

In accordance with a first embodiment of the invention the cold captive preforms and the hot captive preforms are ejected selectively from the production stream by two distinct devices for ejecting preforms from the production stream "P". Accordingly, the production installation 11 includes a first ejector device 34 that ejects the hot captive preforms 12 to a reject stream 38 and a second ejector device 41 that ejects the cold captive preforms to a recycling stream 42.

In this case the two types of captive preforms 12, that is to say the hot captive preforms 12 and the cold captive preforms 12, are sorted while the captive preforms 12 are still following the production stream "P". One of the two ejector devices 34, 41, which is arranged upstream along the production stream "P" relative to the other of the two ejector devices 34, 41, is commanded selectively to eject the type of captive preforms 12 with which it is associated, thus leaving the captive preforms 12 of the other type to continue their movement in the production stream "P" as far as the other of the two ejector devices 34, 41.

The number of preforms 12 to be ejected by the ejector device 34, 41 located more upstream is for example determined as a function of the speed of movement of the preforms. The speed of movement of the preforms in fact allows estimation of the time necessary to cause all the hot captive preforms 12 to pass the more upstream ejector device 34, 41 taking into account the distance between the start of the heating cavity 30 and said more upstream device 34, 41.

In a variant of the invention that is not represented a detector is arranged in the installation to detect the passage of the hot captive preforms 12 at the level of each ejector device 34, 41. This is for example a temperature detector.

In accordance with one embodiment of the invention the heating station 10 is here equipped with the first device 34 for ejecting hot captive preforms 12 that includes ejector means that are arranged along the transport path 18 downstream of the heating cavity 30 and upstream of the exit point "B". The ejector means allow selective release of a preform 12 from its individual support 16 upstream of the exit point "B". The preform 12 ejected in this way is directed to a reject stream 38, for example to a bin 36.

In accordance with the non-limiting example illustrated in FIG. 3 here the ejector means include a switch 40 that is commanded between a retracted position indicated in dashed line in which the roller 25 of the individual support 16 passes under the cam 27, the mandrel 21 therefore remaining in the active position, and a bifurcation position indicated in solid line in which the switch 40 is disposed on the path of the roller 25 to guide the latter in the direction of the cam 27 to command the mandrel 21 in the inactive position and thus to eject the preform 12.

When a preform 12 is ejected by the ejector means of the first ejector device 34 it falls toward the reject bin 36, possibly by means of a toboggan or conveyor.

In a variant of the invention that is not represented the hot captive preforms are ejected from the production stream "P" of preforms downstream of the heating station, for example at the level of the forming station 13, at the same time as non-conforming containers after forming.

In the example represented in FIGS. 1 and 4 the cold captive preforms 12 are ejected from the production stream "P" in the heating station 10. To this end, the heating station 10 includes, in addition to the first ejector device 34 associated with the hot captive preforms 12, a second ejector device 41 that is intended selectively to eject preforms 12 from their individual support 16. The preforms 12 ejected by the second ejector device 41 are therefore extracted from the transport path 18 and follow a recycling stream 42.

As is represented in more detail in FIG. 4 the second ejector device 41 includes ejector means that are distinct from the ejector means of the first ejector device 34 but have the same function. Thus the ejector means of the second ejector device 41 allow selective release of a preform 12 from its individual support 16. Here the ejector means are arranged upstream of the exit point "B" of the heating station 10.

In a non-limiting manner the ejector means of the second ejector device 41 here have the same structure as the ejector means of the first ejector device 34. Thus, in accordance with the example illustrated in FIG. 4, here the ejector means include a switch 46 that is commanded between a retracted position, indicated in dashed line, in which the roller 25 of the individual support 26 passes under the cam 27, the preform 12 therefore not being ejected, and a bifurcation position indicated in solid line in which the switch 46 is disposed on the path of the roller 25 to guide the latter in the direction of the cam 27 to command the mandrel 21 in the inactive position and thus to eject the preform 12.

The preform 12 ejected in this way by the second ejector device 41 is directed to the recycling stream 42.

Here the second ejector device 41 is arranged upstream of the heating cavity 30 in the immediate vicinity of its upstream end.

In a variant of the invention that is not represented the second ejector device 41 is arranged at another position on the transport path 18 located between the entry point "A" and the heating cavity 30, for example at the level of the turn formed around the second wheel 28B.

In accordance with another variant of the invention that is not represented the second ejector device 41 is arranged downstream of the heating cavity 30.

In accordance with another variant of the invention that is not represented the cold captive preforms are ejected from the production stream "P" to the recycling stream 42 downstream of the exit point "B" of the heating station 10, for example when the preforms are taken up by transfer wheels disposed between the heating station 10 and the forming station 13. Thus the second ejector device 41 is arranged downstream of the exit point "B" along the production stream "P".

Of course, when the second ejector device 41 is arranged downstream of the heating cavity 30 the method provides for the emitters 32 of the heating cavity 30 to be maintained in an extinguished state for as long as "cold" captive preforms 12 circulate in the heating cavity 30.

In the example represented in FIGS. 1 and 4 the recycled cold captive preforms 12 are ejected to a conveyor 44 that routes the ejected preforms 12 in the direction of the lining up and straightening up device 15 for lining up and straightening up the cold preforms in order to supply the heating station 10. Thus the recycled preforms 12 are mixed in bulk with new preforms 12 upstream of the heating station 10.

Alternatively, the recycled preforms 12 are stored in a bin pending monetization. In a non-limiting manner monetization may consist in subsequently tipping the preforms 12 recycled in this way into the lining up and straightening up device 15 of the heating station 10 or using them in another production installation of the same type as the production installation 11 to form finished containers or destroying them and using their material to form new preforms 12.

In accordance with a second embodiment of the invention the cold captive preforms 12 and the hot captive preforms 12 are ejected from the production stream "P" by a common ejector device 34. The "cold" captive preforms, respectively the "hot" captive preforms, are then sorted after ejection by the common ejector device 34. They are therefore selectively switched to the recycling stream 42 or to the reject stream 38 by a sorting device 50.

The common ejector device 34 is identical to the first ejector device 34 already described for the first embodiment. In this embodiment the common ejector device 34 is arranged downstream of the heating cavity 30. The common ejector device 34 is arranged along the production stream "P", for example downstream of the exit point "B" of the heating station 10 or upstream of the exit point "B" of the heating station 10.

All the captive preforms 12 are ejected to a common ejection stream across the sorting device 50 is arranged. The sorting device 50 allows selective orientation of the ejected captive preforms 12 to the recycling stream 42 or to the reject stream 38.

Figure 5:
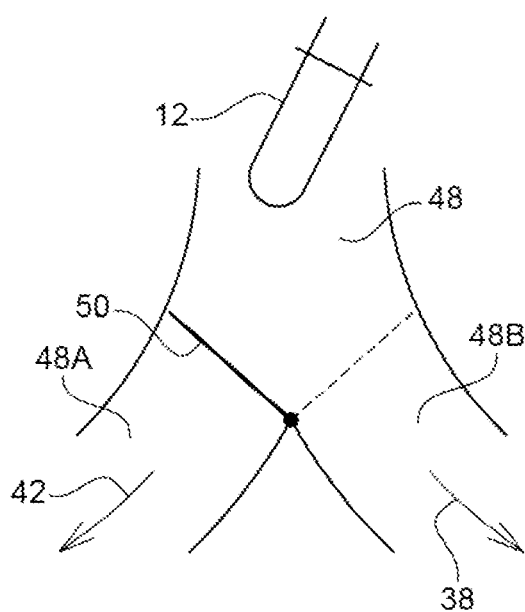
FIG. 5 is a side view that represents schematically means for sorting preforms ejected by a common ejector means selectively in the direction of a reject stream or in the direction of a recycling stream.

In the example represented in FIG. 5 the ejected preforms 12 drop for example into a common toboggan 48 that has two exits: a first exit 48A directed toward the recycling stream 42 and a second exit 48B directed toward the reject stream 38. The preforms 12 are switched to one or the other of the exits 48A, 48B by a mobile flap, here forming the sorting device 50, mounted for example to pivot between two switching positions.

The sorting device 50 is for example commanded between its two positions as a function of the speed of movement of the preforms 12 along the production stream "P". The speed of movement of the preforms 12 in fact allows estimation of the time necessary to evacuate all the hot captive preforms 12 taking into account the distance between the start of the heating cavity 30 and said common ejector device 34.

In a variant of the invention that is not represented a detector is arranged in the installation to detect the passage of the hot captive preforms 12 from the common ejector device 34. It is for example a temperature detector.

During execution of the method in accordance with any one of the embodiments, following the interruption, the conveyor device is restarted to route the captive preforms 12 along the production stream "P".

When the hot captive preforms 12 pass the associated ejector device 34 the latter is commanded to eject them in the direction of the reject stream 38. All the hot captive preforms 12 that have been immobilized after they have been exposed to the electromagnetic radiation emitted by the emitters 32 are therefore ejected to the reject stream because they are likely to be unsuitable for forming finished containers.

Likewise, when the cold captive preforms 12 pass the associated detector device 34 or 41, depending on the embodiment, the latter device is commanded to eject them in the direction of the recycling stream 42.

Of course, when the device 34,41 for ejecting cold captive preforms 12 is arranged downstream of the heating cavity 30 the emitters 32 of the heating cavity 30 are maintained in an extinguished state to prevent the cold captive preforms 12 being heated while they circulate in the heating cavity 30 to reach said ejector device 34, 41.

The invention advantageously allows monetization of the cold captive preforms 12 by separating them from the hot captive preforms 12, the material of which can no longer be used for the production by blowing of thermoplastic material objects.

The invention claimed is:

1. A method for managing of captive preforms (12) immobilized in a heating station (10) during an interruption of production, the heating station (10) forming part of an installation (11) for production of thermoplastic material containers by forming preforms heated by the heating station (10), the preforms (12) following a production stream (P) through the production installation (11), the heating station (10) including:
    a device (14) for conveying preforms (12) including individual supports (16) circulating in a closed circuit, each individual support (16) being intended to support a preform (12) in continuous movement along a predetermined transport path (18) forming a section of the production stream (P) from an entry point (A) to an exit point (B),
    a heating cavity (30) bordered by at least one row of emitters (32) of monochromatic electromagnetic radiation commanded between an extinguished state and a lit state, the heating cavity (30) being crossed by the transport path (18);

the method comprising:
    ejecting from the production stream (P) cold captive preforms that have been immobilized before they have been exposed to the electromagnetic radiation emitted by the emitters (32) to a recycling stream (42); and
    rejecting from the production stream (P) hot captive preforms that have been at least partly exposed to the electromagnetic radiation emitted by the emitters (32) to a reject stream (38) separate from the recycling stream (42),
    wherein the cold captive preforms (12) are ejected from the production stream (P) downstream of the heating cavity (30).

2. The method as claimed in claim 1, wherein the cold captive preforms (12) and the hot captive preforms (12) are selectively ejected from the production stream (P) by two distinct devices (34, 41) for ejecting preforms (12).

3. The method as claimed in claim 1, wherein the cold captive preforms (12) and the hot captive preforms (12) are ejected from the production stream (P) by a common ejector device (34).

4. The method as claimed in claim 3, wherein the cold captive preforms (12), respectively the hot captive preforms (12), ejected by the common ejector device (34) are selectively switched to the recycling stream (42), respectively to the reject stream (38), by a sorting device (50).

5. The method as claimed in claim 1, wherein the cold captive preforms (12) are ejected from the production stream (P) downstream of the exit point (B) of the heating station (10), for example when the preforms (12) are taken up by a transfer wheel arranged directly downstream of the heating station (10).

6. The method as claimed in claim 5, wherein the emitters (32) of the heating cavity (30) are maintained in an extinguished state for as long as the cold captive preforms (12) circulate in the heating cavity (30).

7. The method as claimed in claim 1, wherein at least some of the cold captive preforms (12) oriented toward the recycling stream (42) are subsequently transformed into finished containers by forming after heating.

8. The method as claimed in claim 7, wherein the cold captive preforms (12) oriented toward the recycling stream are again introduced into the production stream (P) upstream of the heating station (10).

9. The method as claimed in claim 1, wherein at least some of the cold captive preforms (12) oriented toward the recycling stream (42) are destroyed and the material thereof is re-used to produce new preforms (12).

10. The method as claimed in claim 1, wherein the production installation (11) includes a forming station (13) that is arranged downstream of the heating station (10) along the production stream (P), the hot captive preforms (12) being ejected from the production stream (P) downstream of the heating station (10), for example at the level of the forming station (13).

11. A heating station (10) comprising:
    a device (14) for conveying preforms (12) including individual supports (16) circulating in a closed circuit, each individual support (16) being intended to support a preform (12) in continuous movement along a predetermined transport path (18) forming a section of the production stream (P) from an entry point (A) to an exit point (B);
    a heating cavity (30) bordered by at least one row of emitters (32) of monochromatic electromagnetic radiation commanded between an extinguished state and a lit state, the heating cavity (30) being crossed by the transport path (18);

a first ejector device (34) arranged along the transport path (18) downstream of the heating cavity (30) allowing selective ejection of a preform (12) from its individual support (16) upstream of the exit point (B), the preform (12) ejected being directed toward the reject stream (38); and a second ejector device (41) arranged along the transport path (18) allowing selective ejection of a preform (12) from its individual support (16) upstream of the entry point (A), the preform (12) ejected in this way being directed toward a recycling stream (42) in the direction of the entry point (A) of the heating station (10).

12. A container production installation (11) comprising a heating station (10) having:
   a device (14) for conveying preforms (12) including individual supports (16) circulating in a closed circuit, each individual support (16) being intended to support a preform (12) in continuous movement along a predetermined transport path (18) forming a section of the production stream (P) from an entry point (A) to an exit point (B);
   a heating cavity (30) bordered by at least one row of emitters (32) of monochromatic electromagnetic radiation commanded between an extinguished state and a lit state, the heating cavity (30) being crossed by the transport path (18); and
   the installation (11) further comprising a common device (34) for ejecting captive preforms (12), the production installation (11) including a device (50) for selectively sorting the preforms (12) ejected by said common ejector device (34) toward a recycling stream (42) or toward a reject stream (38).

13. The method as claimed in claim 2, wherein the cold captive preforms (12) are ejected from the production stream (P) downstream of the heating cavity (30).

14. The method as claimed in claim 3, wherein the cold captive preforms (12) are ejected from the production stream (P) downstream of the heating cavity (30).

15. The method as claimed in claim 2, wherein at least some of the cold captive preforms (12) oriented toward the recycling stream (42) are subsequently transformed into finished containers by forming after heating.

16. The method as claimed in claim 3, wherein at least some of the cold captive preforms (12) oriented toward the recycling stream (42) are subsequently transformed into finished containers by forming after heating.

17. The method as claimed in claim 2, wherein at least some of the cold captive preforms (12) oriented toward the recycling stream (42) are destroyed and the material thereof is re-used to produce new preforms (12).

18. The method as claimed in claim 2, wherein the production installation (11) includes a forming station (13) that is arranged downstream of the heating station (10) along the production stream (P), the hot captive preforms (12) being ejected from the production stream (P) downstream of the heating station (10), for example at the level of the forming station (13).

* * * * *